Patented Feb. 17, 1953

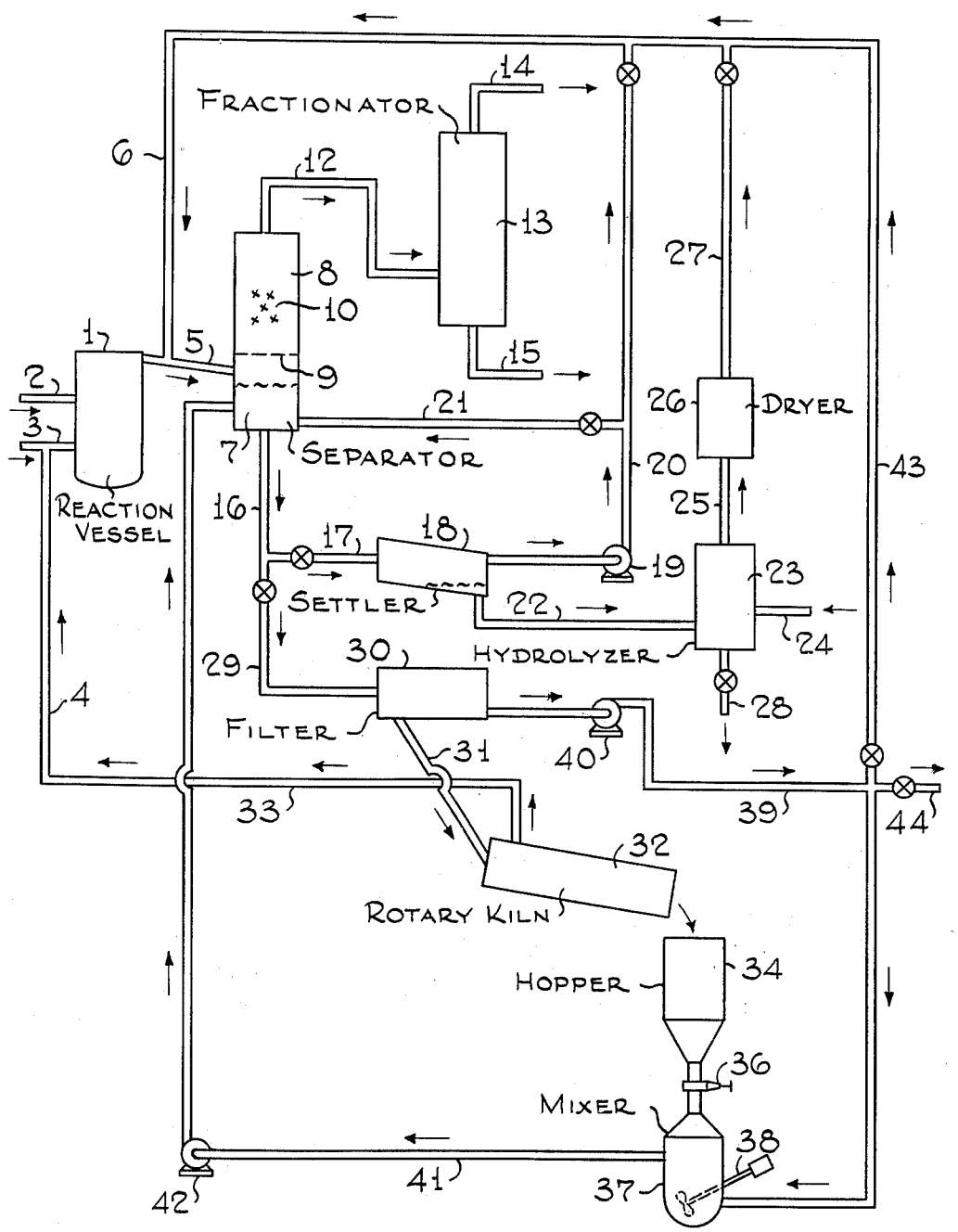

2,628,991

UNITED STATES PATENT OFFICE 2,628,991

REMOVAL OF BORON FLUORIDE FROM REACTIVE HYDROCARBONS

Helmuth G. Schneider, Westfield, N. J., William C. Van Siclen, Douglaston, N. Y., and Paul W. Brakeley, Jr., Plainfield, N. J., assignors to Standard Oil Development Company, a corporation of Delaware Application September 14, 1949, Serial No. 115,732

6 Claims. (Cl. 260—683.15)

This invention relates to a method of promptly eliminating catalytic action of boron fluoride, $BF_3$, present in a gaseous stream containing reactive olefin hydrocarbons as the stream leaves a reaction zone, and to the recovery of materials used in the process.

The elimination of the catalytic activity of the $BF_3$ is accomplished by dispersing into the gaseous stream that contains a reactive hydrocarbon, such as isobutylene, and boron fluoride, a volatile low boiling dialkyl ether, preferably diethyl ether, immediately as the gaseous mixture leaves the reaction zone or by immediately passing the gaseous stream in contact with a nonvolatile oil slurry of sodium fluoride in the presence of a dialkyl ether.

The ether, quickly dispersed into such a gaseous stream, particularly with some of the ether in the vapor phase, acts very rapidly, even at low temperatures to form a complex with the $BF_3$ and thus prevents undesired reaction of the reactive hydrocarbon, which otherwise tends to occur very rapidly in the gas off-take line from a reaction zone. In many instances, it is advantageous to admix a non-volatile hydrocarbon oil with such a vapor stream at the place where the ether is being dispersed so that this oil can act as a flux to carry away the resulting precipitated boron fluoride-ether complex and small amounts of reacted hydrocarbons which are usually entrained in the vapor stream.

In passing the gaseous mixture that contains a reactive hydrocarbon, such as isobutylene, and boron fluoride immediately through a scrubber containing an unreactive, non-volatile hydrocarbon with a slurry of solid sodium fluoride and a small quantity of a volatile, low-boiling dialkyl ether, preferably diethyl ether, the presence of the ether causes the boron fluoride to react rapidly with the sodium fluoride to form a solid complex, sodium fluoborate, $NaBF_4$. The boron fluoride is removed from the gaseous stream, thus preventing undesirable reaction of the reactive hydrocarbon which otherwise tends to occur very rapidly in the gas off-take line from the reaction zone.

Quite unexpectedly in the development of this invention, it was found that $BF_3$ reacts in the presence of very small amounts of ether very rapidly with sodium fluoride even in a hydrocarbon oil medium whereas in the absence of ether the boron fluoride will not react with sodium fluoride in an oil medium to any appreciable extent.

Using described methods of deactivating the catalyst immediately following the reaction zone, it is necessary to employ suitable steps for separating the complex and oil from the remaining vapors which contain the reactive hydrocarbon and inert gaseous hydrocarbon, such as ethane. It is desirable to carry out the separation in such a manner as to permit efficient recovery of the various substances involved.

For separating the oil and $BF_3$ complexes from the gaseous stream, the gaseous stream is scrubbed in a separation zone by contact with oil, and the remaining vapors are further freed of any entrained liquid droplets as they leave the separation zone to be withdrawn to a hydrocarbon recovery system, such as a fractionating column.

There are two principal ways in which the ether and oil can be efficiently recovered for reuse in conjunction with this method of removing boron fluoride from the reactive hydrocarbon. In one of these, the $BF_3$, as well as the oil and ether can be recovered for reuse. This way will be referred to as the dry recovery method, which is particularly important in large scale operations or operations in which the recovery of the $BF_3$ catalyst is an important cost factor. The other method of recovering the ether and the oil, which will be referred to as the wet method, involves hydrolysis of the $BF_3$-ether complex for decomposing the ether complex but actually destroys the catalyst converting the $BF_3$ to ortho-boric acid, fluoboric acid, etc.

The dry method of separating, which permits regeneration and recycling of the $BF_3$, as well as separate recovery of the ether and oil, employs the reaction of the $BF_3$-ether complex with solid sodium fluoride dispersed in an oil to form sodium fluoborate and free ether. The sodium fluoborate complex formed as a solid suspension in the remaining oil-ether solution can be separated by filtration, then can be decomposed by heat to evolve $BF_3$ to be reused in the main reaction, leaving a dry residue of sodium fluoride which may also be returned to the oil scrubbing separation zone.

The wet method of separating, which permits the recovery of the ether and oil but which destroys the boron fluoride employs the hydrolysis of the $BF_3$-ether complex with water alone or a water solution of an alkali. Upon decomposition of the ether-boron fluoride complex, the ether is liberated and may be recovered as a condensed vapor or permitted to remain dissolved in the oil flux which is removed by settling.

For the above described dry method of recovery, the gaseous stream containing a reactive hydrocarbon and boron fluoride is scrubbed through a hydrocarbon oil containing solid sodium fluoride and a small quantity of dialkyl ether immediately following the reaction zone, sodium fluoborate is formed and the oil and ether as well as the $BF_3$ may be recovered. The sodium fluoborate is removed as an oil slurry and filtered, the oil-ether filtrate being returned to the scrubber. The solid sodium fluoborate is decomposed by heat to evolve $BF_3$, which can be reused in the main reaction, and leaves a solid residue of sodium fluoride, which may also be returned to the oil scrubbing zone.

The described operations will be explained in further detail with reference to the accompanying drawing which illustrates diagrammatically a flow plan of means that may be employed.

Referring to drawing, 1 represents a reaction vessel for carrying out any of the various reactions of reactive hydrocarbons with a $BF_3$ catalyst, including the well known low-temperature polymerizations of $C_3$-$C_5$ olefins, particularly the polymerization of isobutylene or copolymerization of isobutylene with a diolefin at temperatures below 0° C.

The hydrocarbon reactants are supplied to the reaction vessel 1 through line 2. Gaseous $BF_3$ catalyst is supplied from line 3 and from recycle line 4. Generally, in these reactions, a liquefied normally gaseous diluent is also supplied with the reactants to act as an internal refrigerant. Such a diluent may be liquefied ethane, propane, etc.; and during the course of the reaction a gaseous stream containing the volatilized refrigerant or diluent with substantial amounts of the hydrocarbon reactant that is unreacted and excess gaseous $BF_3$ catalyst, is withdrawn from an upper part of the reaction zone, as through line 5. This withdrawn gaseous stream also tends to contain a small amount of entrained polymer of the reactive hydrocarbon, which quickly forms even in the gaseous mixture as it is being withdrawn from the reactive zone. Consequently, it was determined that steps had to be taken to eliminate the activity of the $BF_3$ catalyst in this stream as promptly as possible. Otherwise, a substantial proportion of the reactive hydrocarbon undergoes polymerization to undesired polymers in the withdrawal line and the polymers formed tend to clog the line.

When the wet recovery is used, a low boiling dialkyl ether is introduced by line 6 in the form of a mist, as vapor, or both, carefully proportioned to form the $BF_3$ complex immediately as the ether is brought into intimate admixture with the $BF_3$-containing gaseous stream leaving reaction vessel 1 by line 5. The ether-complex consists of an equimolecular proportion of the ether and the $BF_3$.

In order to obtain the quick formation of the complex in the usual low temperatures of the gaseous stream, e. g. below 0° C., it is best to have a substantial amount of the ether in the vapor phase, and accordingly, the most suitable ethers for this purpose are the $C_2$-$C_6$ dialkyl ethers, e. g. dimethyl-, diethyl-, and di-isopropyl ethers. The complexes formed precipitate out as liquid droplets.

Through the same line 6, the desired flux oil may be introduced with ether dissolved therein, in the form of a mist, or together with vapor of the ether in order to carry away entrained polymer and liquid complex which tend to become deposited on the walls of the pipe line 5. This oil is preferably a nonvolatile oil, such as a petroleum base lubricating oil, which remains completely liquid and inert under the conditions of operation, but lower boiling naphthas or gas oil range hydrocarbons may be used.

The gas-liquid mixture flowing through line 5 is introduced at its discharge end into an accumulated body of the oil 7 in the lower part of a separating vessel 8 in order to insure the scrubbing out of entrained liquid particles from the remaining gaseous material which is bubbled up through the oil pool 7. The thus separated gaseous substances are then made to pass upwardly through a grating 9 past a packing 10 of inert solid materials, such as porcelain Raschig rings to knock out any entrained liquid droplets and these liquid droplets removed from the gas stream can flow downwardly back into the oil pool 7. The gaseous materials freed of entrained droplets are withdrawn through line 12 into a fractionating column 13, wherein a fractional distillation is accomplished to withdraw overhead by line 14 the volatile diluent, e. g. ethane, and to recover, as bottoms, the reactive hydrocarbon, e. g. isobutylene, withdrawn from the column 13 by line 15. This separated isobutylene might contain a small or negligible amount of ether and can be returned to the reaction vessel 1 or be sent to a feed purification system, as desired. Likewise, the recovered highly volatile refrigerant taken overhead by line 14 can be returned to reaction vessel 1 in desired proportions.

When the dry recovery method is used, the oil pool 7 at the bottom of the separating vessel 8 will contain dissolved therein a small amount of free ether and dispersed solid NaF. The gaseous stream leaving the reaction zone is immediately passed into the oil body, and injection of ether from line 6 can be omitted. The $BF_3$ in the gaseous stream then quickly undergoes reaction with the NaF to form sodium fluoborate, $NaBF_4$, in the presence of ether, at the required temperatures of separation say in the range of −15° C. to 25° C.

When employing the wet method recovery, wherein NaF is not dispersed in the oil at the lower part of the separation zone in vessel 8, the oil and $BF_3$-ether complex mixture is withdrawn from the bottom of the separated vessel 8 through lines 16 and 17 to a settler 18, in which the oil separates as an upper layer and the complex gravitates downwardly to form a lower layer. The oil separated as an upper layer contains a small amount of ether and this oil is recycled with the aid of pump 19 through line 20, particularly to line 6 and mainly by way of line 21 back to the bottom section of separating vessel 8. The $BF_3$ complex is withdrawn from the bottom of the settler through line 22 to a vessel 23 which is supplied with water or water solution of alkali from line 24 for hydrolyzing the complex. In vessel 23, the admixed water decomposes the complex exothermically, and ether vapor evolved from the hydrolyzed mixture is withdrawn through line 25, thence through a drier 26, from which dry ether vapor is delivered by line 27 back to the line 6. The residual aqueous mixture of the hydrolyzed $BF_3$ is withdrawn from vessel 23 by line 28. In the drier, various desiccants, such as, calcium chloride, etc. may be used. In this wet method of recovery it is not possible to recover the $BF_3$ as such for reuse.

In using the dry recovery method, the oil slurry or finely divided solid $NaBF_4$ complex, with a small amount of ether dissolved in the oil, is withdrawn through line 16 and 29 to a filter 30. Any conventional filter apparatus, such as a plate-and frame-press, centrifugal, or continuous filter is represented by the filter 30. In the filtration, the solid NaBF₄ is passed via chute or conveyor 31 into the upper end of a rotary calcining kiln 32, wherein the solid NaBF₄ is heated to a temperature of about 384° C. for decomposition.

In the decomposition of the solid NaBF₄, gaseous BF₃ is evolved and is withdrawn by line 33 from the upper part of the kiln for recycling to the reaction vessel 1 via line 4. The residue of solid NaF is discharged from the lower end of the kiln 32 into a storage hopper 34. In the storage hopper 34 the NaF is cooled; then as needed, the NaF is withdrawn from the storage hopper 34 past a gate valve 36 into a slurry mixing vessel 37 equipped with an agitator 38. A portion of the filtrate passed through line 39 from the filter 30 by pump 40 is made to flow into the vessel 37 to make up a slurry of the NaF in the oil, which is then returned through line 41 with the aid of pump 42 into the lower part of the separation vessel 8, therein to replenish the scrubbing oil pool 7. Another portion of the filtrate withdrawn from filter 30 may be delivered from line 39 into line 43 for recycling to line 6, which injects the oil-ether solution into the reaction zone gaseous effluent leaving vessel 1 through line 5. Still another portion of this oil filtrate having a small amount of ether and some of the polymer in solution is removed from the system through line 44 in order to avoid excessive polymer build-up in the system. This oil solution having acquired some thickening due to the presence of the polymers therein, can be easily stripped of the volatile ether and then employed commercially.

To demonstrate the invention the following operation and experimental test studies were carried out.

In a continuous polymerization of isobutylene at temperatures below −15° C. to form high molecular weight isobutylene polymers using liquefied ethane as an internal refrigerant, tests were conducted on the gaseous effluent.

Example 1

Before the use of ether injection into the gaseous effluent leaving the reaction vessel, samples of the effluent showed an average content of 0.1% BF₃ present in the effluent gases. It was also determined that this effluent passing through the gas off-take line in a period of about 1 second brought about a loss of as much as 15% of the isobutylene based on the isobutylene feed to the reaction vessel. When a small amount of ether was injected into the line at the point where the gaseous effluent is withdrawn from the reaction vessel, it was found that the amount of free active BF₃ was promptly reduced to a practically negligible amount through the formation of BF₃-ether complex, that was then removed from the gaseous stream. Thus, it was definitely determined that the BF₃ could be immediately converted into the complex and could be practically completely recovered without introducing water vapor into the recycle gases and without unduly contaminating the recycled hydrocarbons with ether, since it is undesirable to thus contaminate the recycled unsaturated hydrocarbons which are to be recycled and that this could be accomplished by use of a liquid hydrocarbon scrubbing medium.

Further experimental investigation showed that it was possible to reduce the amount of ether to a minimum quantity substantially lower than a molar proportion with respect to the BF₃ in the gaseous mixture for removing the BF₃ therefrom by having the gaseous mixture scrubbed or contacted by liquid hydrocarbons, preferably paraffinic or inert, containing dispersed NaF, provided a small catalytic quantity of the dialkyl ether is admixed with the oil. The merits of this discovery are brought out by the following comparative examples:

Example 2

3 moles of powdered sodium fluoride was suspended in a kilogram of paraffinic petroleum lubricating oil. A gaseous stream containing BF₃ was bubbled into the oil at a rate of about 2 moles per hour, and 100 minutes in each run while the oil was maintained at a temperature of 25° C. In one of these runs 0.13 mole of diethyl ether was dissolved in the oil, amounting to 0.04 mole of the ether present per mole of BF₃ passed into the oil mixture. It was found that with no addition of the ether to the oil mixture no appreciable reaction between BF₃ with NaF occurred in the oil; whereas, with the small amount of the ether present, the entire quantity of 2.9 moles BF₃ were reacted.

Thus, it was proved that where it is desirable to restrict the amount of ether present in the system and when it is desirable to dispense with extra apparatus for separating the ether, it is possible to pass gaseous mixtures containing catalytic BF₃ immediately into contact with an oil slurry of the NaF or equivalent metal halides with extremely small amounts of ether dissolved in the oil so as to promptly form NaBF₄ and thus abruptly eliminate the catalyst from the gaseous mixture. In this operation the extremely small amount of ether is principally retained in the oil mixture and thus acts catalytically to speed up the reaction and make the reaction go to completion. Other metal halides which may be used with sodium fluoride or substitutions therefor include calcium fluoride, aluminum fluoride, etc. It has been known that BF₃ reversibly reacts with various metal halides as indicated by the following general equation:

$$BF_3 + MF \rightleftharpoons MBF_4 \text{ (or } MF \cdot BF_3)$$

wherein M represents a monovalent metal and wherein other halogens may be substituted for the fluoride constituent of the metal. The equation can be balanced for other polyvalent metals.

The method of removing the BF₃ catalyst from gaseous streams leaving a reaction zone as herein described has been demonstrated to have definite technical advantages over other methods previously suggested and tried. For example, with respect to processes described in U. S. Patent 2,435,229 and 2,229,661 of M. D. Mann, Jr., by employing the present improved method quicker elimination of the BF₃ catalyst is accomplished, the recovered gaseous hydrocarbon reactant stream is free of moisture, and lines are kept from becoming clogged. The ether-complexes formed are practically stable, unreactive with the unsaturated hydrocarbon, and non-corrosive. They have only slight solubility in the hydrocarbon flux oil and can be separated easily from this oil. The amount of the ether used is controlled with precision to avoid contaminating the recycle reactant stream, since the low molecular weight ethers can be intimately mixed with the gaseous stream rapidly and thus rapidly form complexes with the gaseous BF₃.

The method of the present invention can be readily seen to be suitable for segregating gaseous BF₃ from gaseous streams containing various kinds of organic compounds which tend to be catalyzed into condensation, polymerization or interpolymerization reactions by the BF₃. With the dry recovery method the BF₃ can be segregated and recovered for reuse, even if other complex forming organic compounds are present, such as alcohols, acids, esters, halogens, halogenated organic compounds, sulfur-containing compounds, etc. are present.

What is claimed is:

1. The method of removing catalytic boron fluoride from a gaseous mixture containing isobutylene before the isobutylene has time to form a substantial amount of polymer, which comprises dispersing into a stream of said gaseous mixture a $C_2$ to $C_6$ dialkyl ether in no more than a slight excess necessary to form a complex with the BF₃ in said gaseous mixture so that vapors of the ether immediately form the complex, scrubbing the resulting gaseous mixture containing the complex dispersed therein with a hydrocarbon that remains inert and liquid under the operation conditions to free the isobutylene gas of complex and ether and any slight residual excess ether, separating the thus scrubbed isobutylene gas from the resulting liquid hydrocarbon flux of the boron fluoride complex dispersed therein and the ether dissolved therein.

2. The method described in claim 1, wherein the gaseous mixture is scrubbed by the liquid hydrocarbon containing a dispersed metal halide which combines with the BF₃ in the presence of the dialkyl ether.

3. In a process of removing and recovering catalytic BF₃ and isobutylene from a gaseous stream thereof, the steps which comprise injecting into said stream a $C_2$ to $C_6$ dialkyl ether in an amount not more than a slight excess needed to react with the BF₃ in forming a complex therewith, scrubbing the isobutylene in the remaining gaseous stream with hydrocarbon oil containing a metal halide that decomposes the complex of the ether with the BF₃ and combines with the BF₃ to form a solid complex retaining the ether in the oil, collecting the solid complex from the hydrocarbon oil, decomposing said solid complex to recover the metal halide with liberation of the BF₃ gas from the complex, and redispersing said metal halide in hydrocarbon oil used in collecting more of the solid complex from the gaseous mixture of BF₃ and isobutylene.

4. A process of removing and recovering catalytic BF₃ from a gaseous mixture containing isobutylene, which comprises contacting a stream of said gaseous mixture with a liquid hydrocarbon oil slurry of a metal halide which combines with the BF₃, simultaneously supplying a small amount of $C_2$ to $C_6$ dialkyl ether in said hydrocarbon oil for effecting rapid reaction of the BF₃ with the metal halide, withdrawing gaseous isobutylene substantially free of BF₃ and substantially free of the dialkyl ether from the resulting liquid hydrocarbon oil slurry of the resulting solid metal halide-BF₃ complex with the ether dissolved in the oil, and removing the resulting metal halide-BF₃ complex from said resulting hydrocarbon oil slurry.

5. In a process of polymerizing isobutylene with BF₃ catalyst at low temperatures to form isobutylene polymers, wherein a gaseous stream containing unreacted gaseous isobutylene and free gaseous BF₃ is removed from the polymerizing reaction zone, the steps which comprise immediately admixing an inert liquid hydrocarbon oil and a small amount of a $C_2$ to $C_6$ dialkyl ether with said gaseous stream as it leaves the reaction zone, the amount of dialkyl ether being no more than a slight excess of that necessary to form a complex with the BF₃ in the gaseous stream, collecting the resulting BF₃ complex in the liquid hydrocarbon oil with any unreacted portion of the dialkyl ether, separating the remaining gaseous isobutylene from the liquid hydrocarbon oil containing a slurry of the BF₃ complex, and freeing the gaseous isobutylene of liquid droplets to recover a recycle stream of isobutylene substantially free of BF₃ and substantially free of the dialkyl ether.

6. In a process of removing and recovering BF₃ from a gaseous stream containing isobutylene, the steps which comprise scrubbing the gaseous stream with an inert liquid hydrocarbon slurry of finely divided sodium fluoride, simultaneously admixing a small amount of a $C_2$ to $C_6$ dialkyl ether dissolved in the liquid hydrocarbon to catalyze the reaction of the BF₃ with the sodium fluoride, separating the remaining gaseous isobutylene from the liquid hydrocarbon slurry containing the complex of the BF₃ formed with the sodium fluoride and containing the dialkyl ether in solution, and thereafter separating the resulting solid complex from the liquid hydrocarbon.

HELMUTH G. SCHNEIDER.
WILLIAM C. VAN SICLEN.
PAUL W. BRAKELEY, Jr.

REFERENCES CITED

The following references are of record in the file of this patent:

UNITED STATES PATENTS

| Number | Name | Date |
|---|---|---|
| 2,135,458 | Schultz | Nov. 1, 1938 |
| 2,135,460 | Loder | Nov. 1, 1938 |
| 2,374,958 | Rummelsburg | May 1, 1945 |
| 2,377,396 | Axe | June 5, 1945 |
| 2,408,007 | Thomas et al. | Sept. 24, 1946 |
| 2,462,739 | Gresham | Feb. 22, 1949 |
| 2,521,940 | Oriolo | Sept. 12, 1950 |